(12) United States Patent  (10) Patent No.: US 9,528,830 B2
Gerson et al.  (45) Date of Patent: Dec. 27, 2016

(54) ANGULAR RATE SENSOR

(71) Applicant: Ramot at Tel-Aviv University Ltd., Tel Aviv (IL)

(72) Inventors: Yuval Gerson, Tel Mond (IL); Viacheslav Krylov, Holon (IL); Yotam Bar-On, Raanana (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 314 days.

(21) Appl. No.: 14/334,216

(22) Filed: Jul. 17, 2014

(65) Prior Publication Data

US 2015/0316377 A1  Nov. 5, 2015

Related U.S. Application Data

(60) Provisional application No. 61/847,121, filed on Jul. 17, 2013.

(51) Int. Cl.
*G01C 19/5642* (2012.01)
*G01C 19/574* (2012.01)

(52) U.S. Cl.
CPC ......... *G01C 19/5642* (2013.01); *G01C 19/574* (2013.01)

(58) Field of Classification Search
CPC ................... G01C 19/5642; G01C 19/574
See application file for complete search history.

(56) References Cited

U.S. PATENT DOCUMENTS

| 6,230,563 | B1* | 5/2001 | Clark | G01C 19/5719 73/504.04 |
| 2005/0072231 | A1* | 4/2005 | Chojnacki | G01C 19/5747 73/504.14 |
| 2010/0244819 | A1* | 9/2010 | Johnson | G01C 19/574 324/244 |

(Continued)

OTHER PUBLICATIONS

Slava Krylov et al. "Excitation of large-amplitude parametric resonance by the mechanical stiffness modulation of a microstructure" IOPscience 20:015041:1-13 (2010).

(Continued)

*Primary Examiner* — Francis Gray
(74) *Attorney, Agent, or Firm* — Browdy and Neimark, P.L.L.C.

(57) ABSTRACT

A rotation sensing device is presented. The device comprises: a proof mass arrangement comprising at least one pair of proof masses spaced-apart from one another along a first axis; a suspension assembly comprising flexible suspension beams having a main axis deformable between their substantially straight and curved states, the suspension assembly coupling the proof masses to an anchor assembly, while allowing a drive-mode oscillatory movement of the proof masses at least along a second axis substantially perpendicular to the main axis of the beams; and an actuation mechanism configured and operable to cause the drive-mode oscillatory movement of the proof masses in opposite directions along said second axis, thereby generating a sense-mode oscillatory movement of the proof masses during the rotation of the device about at least one rotation axis perpendicular to said second axis, said sense-mode movement being indicative of a rate of the rotation.

22 Claims, 13 Drawing Sheets

(56) References Cited

U.S. PATENT DOCUMENTS

2014/0165724 A1* 6/2014 Krylov .................. G01P 15/097
73/514.15

OTHER PUBLICATIONS

Jeffrey F. Rhoads et al "Mechanical Domain Parametric Amplification" Journal of Vibration and Acoustics. 130:061006-1/7 (2008).
Slava Krylov et al "Large displacement parallel plate electrostatic actuator with saturation type characteristic" Science Direct. Sensors and Actuators A 130-131:497-512 (2006).
Sergei A. Zotov et al "Frequency Modulation Based Angular Rate Sensor" IEEE MEMS 577-580 (2011).

* cited by examiner

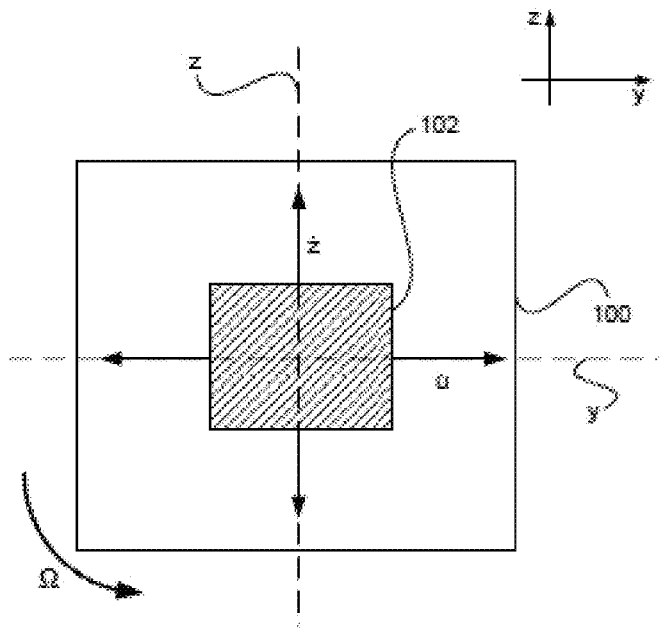
Fig. 1 (General Art)
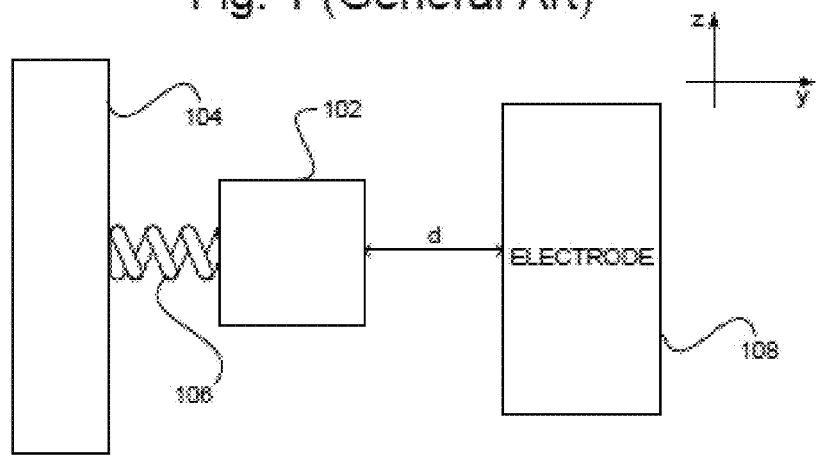
Fig. 2 (General Art)

ANGULAR RATE SENSOR

TECHNOLOGICAL FIELD AND BACKGROUND

This invention relates to the field of micro-electrical mechanical systems (MEMS), MEMS actuators, and more particularly to MEMS angular rate sensors.

A gyroscope is a device for measuring an angle of rotation or angular velocity, based on the principles of conservation of angular momentum. Larger gyroscopes include one or more rotating portions, typically massive gimbaled disks or rings, the construction of which requires axes and bearings. An implementation of unidirectional, non-vibratory (e.g., spinning) motion in microstructures is difficult due to low reliability of microfabricated parts performing relative motion unavoidably accompanied by contact, friction and possibly stiction. Therefore, MEMS gyroscopes are generally realized as compliant vibratory gyroscopes.

GENERAL DESCRIPTION

There is a need in the art in a novel approach for fabricating MEMS based gyroscopes. This is associated with the following problems of the known techniques of the kind specified.

Referring to FIGS. 1 and 2, a state of the art vibratory gyroscope is illustrated. Before describing the drawings, it should be noted that in the descriptions of the drawings, reference is made to the x, y, and z axes of a Cartesian coordinate system, in which the x, y, and z axes are perpendicular to each other. In different figures, the Cartesian coordinate system may be oriented in different manners. In each figure, the corresponding Cartesian coordinate system is drawn, and reference to the axes in the description corresponding to each specific figure is to be understood as the reference to the Cartesian coordinate system drawn within the same figure.

FIG. 1 illustrates a general example of a single mass vibratory gyroscope. The vibratory gyroscope is joined to an object (a "platform" or a "vehicle") 100, and is configured for measuring the angular velocity SI thereof. The vibratory gyroscope includes a proof mass 102 having a mass M, and a driving assembly to vibrate the mass along a plane, or, more simply along an axis y—this first vibration is known in the art as drive mode vibration. The instantaneous in-plane velocity of the mass 102 in the y-axis is u̇. As the object/platform 100 rotates about the x axis (out of the page), the Coriolis force ($F_c$) generated by the rotation causes the proof mass to vibrate along the z-axis (sense mode vibration), and the instantaneous velocity of the vibration along the z-axis is ż. The vibration along the z-axis is measured, and used for calculating the Coriolis force. Through the calculated Coriolis force, the angular velocity Ω can be derived.

The Coriolis force (Fc) is directly dependent on the drive mode velocity u̇ along the y-axis, as shown in equation 1:

$$F_c = 2M\Omega \dot{u} \quad \text{(equation 1)}$$

The amplitude of the vibration of the proof mass 102 along the z-axis is also directly proportional to the Coriolis force. Because the vibration along the z-axis is the measured phenomenon, it is desirable that the amplitude of such vibration be maximized, in order to increase the sensitivity of the vibratory gyroscope. In other words, it is desirable to increase the motion along the z-axis, caused by a given angular velocity 52. For this purpose, therefore, it is desirable to maximize the Coriolis force, and therefore maximize the velocity u̇.

The inventors have found that in vibratory gyroscopes, two factors generally limit the drive-mode velocity u̇: the actuation force applied to the proof mass and the distance that the proof mass can travel. As can be seen in FIG. 2, in MEMS, the proof mass 102 is generally attached to an anchor 104 by a compliant beam 106 that acts as a spring. The proof mass 102 is electrically charged, and can therefore be actuated by an electrostatic force using an electrode 108 located at a distance d from the proof mass 102. The actuation force grows as the distance d falls. Therefore, if d is small, the actuation force is large, but the amplitude of the proof mass' oscillation is also small, as it cannot be larger than d. In practice, the maximally achievable displacement is even smaller, due to the so-called pull-in electrostatic instability taking place (in the case of parallel-plate electrodes) at d/3. On the other hand, if d is large, the amplitude of the proof mass' oscillation can also be large, enabling high instantaneous velocity u̇, but the actuation force decreases.

In some gyroscopes, comb electrodes are used to increase the actuating force. The proof mass includes a first set of plate-like electrodes 110, while a second set of plate-like electrodes 112 is fixed to an anchor 114. Because of the large number of electrodes, the actuation force is large. However, even in comb drive transducers, the maximally achievable travel is still limited by electrostatic instabilities finally related to the small distances between the electrodes. In many vibratory gyroscopes, the typical maximal amplitude of in-plane vibration is in the order of 10 µm.

It would therefore be desirable to have a vibratory gyroscope having increased actuating force, increased amplitude of in-plane oscillation, and optionally being less vulnerable to the instabilities.

The present invention provides a novel structure for vibratory gyroscopes, in which the amplitude of oscillation is not limited by a distance between the proof mass and the electrode. The present invention therefore enables the application of a large actuating force on the proof mass, and provides an increased space for the drive-mode oscillations to take place.

According to the present invention, a vibratory gyroscope is provided, in which a pair of spaced apart proof masses is present. Each mass is attached to an anchor via one or more flexible beams. Each of the beams is clamped at one of it ends whereas the other end is attached to the mass in such a manner that the slope between the deformed beam and the line corresponding to the initial shape of the beam remains zero at the attachment point (so-called "clamped-guided" beams). In other words, the deformed beam has a center of symmetry about an inflection (zero-curvature) point located at the midspan of the beam. An actuating electrostatic force varies in a periodic fashion over time and acts on each of the proof masses along the main axis of the beams. The electrostatic force may be produced by an electric potential applied to the pair of spaced apart proof masses, or to an electrode located between the proof masses. The periodic variation of the actuating force causes the proof masses to move in opposite directions with respect to each other. Since the masses always move in the opposite direction with identical amplitudes, the momenta of the masses has different sign. Therefore, the total momentum of two masses is zero and the center of gravity of two masses is fixed in space. This feature is beneficial because no momentum is transferred to the substrate through the anchors, resulting in smaller reaction forces acting on the anchors and consequently reduced radiation of elastic waves traveling away from the anchors and taking away part of the vibration energy (so-called acoustic losses of the device).

As described above, each of the proof masses is connected to one or more anchors by one or more beams. Preferably, each proof mass is connected to the anchor(s) by at least two beams. The periodic variation of the actuating force also causes the beams to fluctuate between a curved state and a straight state. When the beams are curved, the proof masses are pulled toward the respective anchors (movement along the main axis of the beams), while moving along an axis substantially perpendicular to the main axis of the beams. When the beams are straight, the proof masses are pulled toward each other (or toward the electrode between them), while moving along an axis substantially perpendicular to the main (longitudinal) axis of the beams. The movement along the main axis of the beams is considerably smaller than the movement along axes perpendicular to the main axis of the beams. Therefore the main oscillating motion of the proof masses occurs in a direction perpendicular to the main axis of the beams. This enables the proof masses to be located very close to the actuating electrodes or to each other, without limiting the oscillating motion along the axis perpendicular to the main axis of the beams. Moreover, since each proof mass is in its closest position to the electrode(s) when the beams are straight, no pull-in instability can occur due to very high tensile stiffness of the beams. Therefore, the device of the present invention is less prone to the pull-in instability.

The electrostatic actuating force acts on each of the proof masses along the main axis of the beams, resulting in a periodic tensile force applied to the beam's ends. This leads to the periodic variation of the effective stiffness of the structure, and consequently to parametric excitation of the device. Parametric excitation of a device is a harmonic excitation brought about by variation of the device's parameter(s) in time. The variation of the parameter(s) drives the system. When compared to non-parametric excitation, parametric excitation of the device brings about a sharper transition from low-amplitude non-resonance to high-amplitude resonance condition. Since the sense-mode oscillation is a growing function of the parametrically excitable drive-mode oscillation the amplitude of the sense mode oscillation of the device quickly rises in response to rotation (and therefore generation of the Coriolis force), increasing the sense mode velocity and oscillation amplitude, thereby raising the sensitivity of the gyroscope. Thus, the parametric excitation of the gyroscope of the present invention results in a quicker response and higher sensitivity of the gyroscope. In other words, higher amplitudes of the drive-mode motion produced by highly efficient parametric excitation result in higher amplitudes of the sense-mode motion and consequently in higher sensitivity of the device.

Therefore, an aspect of some embodiments of the present invention relates to a rotation sensing device. In the rotation sensing device, a structure is present including a proof mass arrangement, a suspension assembly, and an actuation mechanism. The proof mass arrangement includes at least one pair of proof masses spaced-apart from one another along a first axis. The suspension assembly includes flexible suspension beams having a main axis deformable between their substantially straight and curved states, the suspension assembly coupling the proof masses to an anchor assembly, while allowing a drive-mode oscillatory movement of the proof masses at least along a second axis substantially perpendicular to the main axis of the beams. The actuation mechanism is configured and operable to cause the drive-mode oscillatory movement of the proof masses in opposite directions along said second axis, thereby generating a sense-mode oscillatory movement of the proof masses during the rotation of the device about at least one rotation axis perpendicular to said second axis. The sense-mode movement is indicative of a rate of the rotation.

The actuation mechanism is adapted to cause drive-mode oscillatory movement via the application of an electrostatic force to the proof masses, which cause the deformation of the beams and periodic variation of the beams' stiffness to thereby parametrically excite the drive-mode oscillatory movement.

According to some embodiments of the present invention, the first axis along which the proof masses are spaced is substantially perpendicular to said second axis along which the proof masses move in drive mode.

In a variant, the proof masses of the pair face one another by their first sides, and each of the proof masses is coupled by a predetermined number of said beams to one or more anchors of the anchor assembly located at a second opposite side of the proof mass.

In another variant, the actuation mechanism comprises said proof masses being made of electrically conductive material composition, thereby allowing charging of the proof masses to create the electrostatic force therebetween.

In yet another variant, the above device comprises an electrodes arrangement comprising at least one central electrode located in a space between the proof masses of the pair.

In a further variant, the above device comprises an inner electrodes arrangement, which comprises at least two inner electrodes, each located between a respective one of the proof masses and the one or more anchors located at the second opposite side of the respective proof mass.

In yet a further variant, the proof masses of the pair are mechanically coupled to one another by a swing element configured for a pivotal rotation about an axis perpendicular to both the first axis and the second axis, such that the movement of one of the proof masses in one direction along said second axis causes the pivotal rotation of the swing element resulting in the movement of the other proof mass in the opposite direction along said second axis.

Optionally, said structure is substantially symmetric about the first axis.

According to some embodiments of the present invention, the first axis along which the proof masses are spaced is substantially parallel to the second axis along which the proof masses move in drive mode.

In a variant, each of the proof masses is enclosed between first and second anchors of the anchor assembly located at first and second opposite sides of said proof mass.

Optionally, the above device comprises an electrodes arrangement, comprising movable electrodes and fixed electrodes, wherein each of said proof masses is enclosed between first and second movable electrodes which are located at said first and second opposite sides of said proof mass, each the first and second movable electrodes being connected to the one of the first and second anchors respectively via at least one of said beams and connected to the respective proof mass via at least another one of said beams.

According to some embodiments of the present invention, said rotation axis is the main axis of the beams and wherein said sense-mode movement is along a third axis which is perpendicular to said main axis of the beams and to said second axis.

In a variant, said drive-mode movement is along the second axis and along the third axis, and said sense-mode movement is along the third axis.

Optionally, said movements along the second axis and along the third axis in the drive mode have a predetermined phase difference, and said sense mode movement along the third axis affects an overall movement of the proof masses along the third axis, causing a change in the predetermined phase difference, said change in the predetermined difference being indicative of the rate of rotation.

According to some embodiments of the present invention: each of the proof masses is coupled to the suspension assembly via a respective frame; the actuation mechanism is configured and operable to cause the drive-mode oscillatory movement of the frames along the second axis; and each proof mass is joined to the respective frame via a joining element which enables movement of the proof mass relative to the respective frame.

In a variant, the movement of the proof mass relative to the respective frame comprises a tilting motion along a plane perpendicular to the second axis.

In another variant, said rotation axis is the main axis of the beams, and the sense-mode movement of the proof masses comprises the tilting motion along a plane perpendicular to the second axis.

In yet another variant, the movement of the proof mass relative to the respective frame comprises a translation along the main axis of the beams.

Optionally, the rotation comprises rotation about an axis perpendicular to the main axis of the beams and to the second axis, and the sense-mode movement of the proof masses comprises the translation along the main axis of the beams.

According to some embodiments of the present invention, the above device comprises a measuring unit for measuring at least one parameter of said oscillatory sense-mode movement, thereby enabling calculation of said rate of rotation.

According to another broad aspect of the invention, it provides a rotation sensing device comprising: at least one pair of proof masses spaced-apart from one another along a first axis; a suspension assembly comprising flexible suspension beams having a main axis deformable between their substantially straight and curved states, the suspension assembly coupling the proof masses of said at least one pair of proof masses to an anchor assembly, while allowing a drive-mode oscillatory movement of the proof masses at least along a second axis substantially perpendicular to the main axis of the beams; and an actuation mechanism adapted to apply an electrostatic force to the proof masses to cause the drive-mode oscillatory movement of the proof masses in opposite directions along said second axis, such that a sense-mode oscillatory movement of the proof masses is generated during the rotation of the device about at least one rotation axis perpendicular to said second axis, said sense-mode movement being indicative of a rate of the rotation.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 1 is a schematic drawing illustrating the principles of operation of a single mass vibratory gyroscope, as known in the art;

FIG. 2 is a schematic drawing illustrating an example of a mass-spring system actuated by a parallel plate electrode, as often implemented in a vibratory gyroscope, as known in the art;

DETAILED DESCRIPTION OF EMBODIMENTS

Figure 3A:
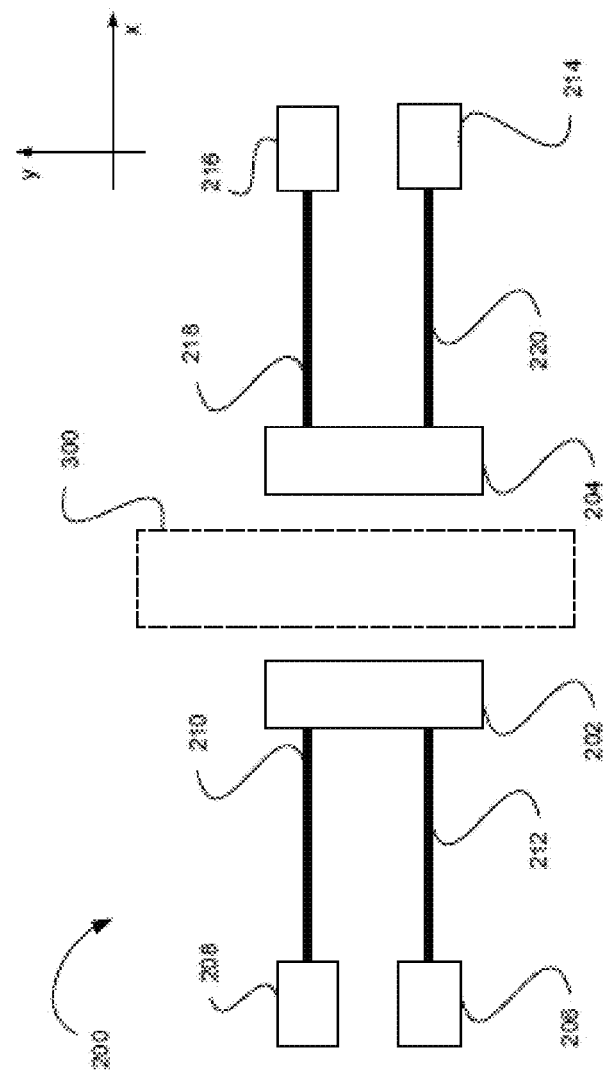
FIG. 3a is a schematic drawing illustrating some embodiments of the present invention, in which two proof masses are suspended using clamped-guided beams and are actuated by an electrostatic force directed along the beams.
Figure 3B:
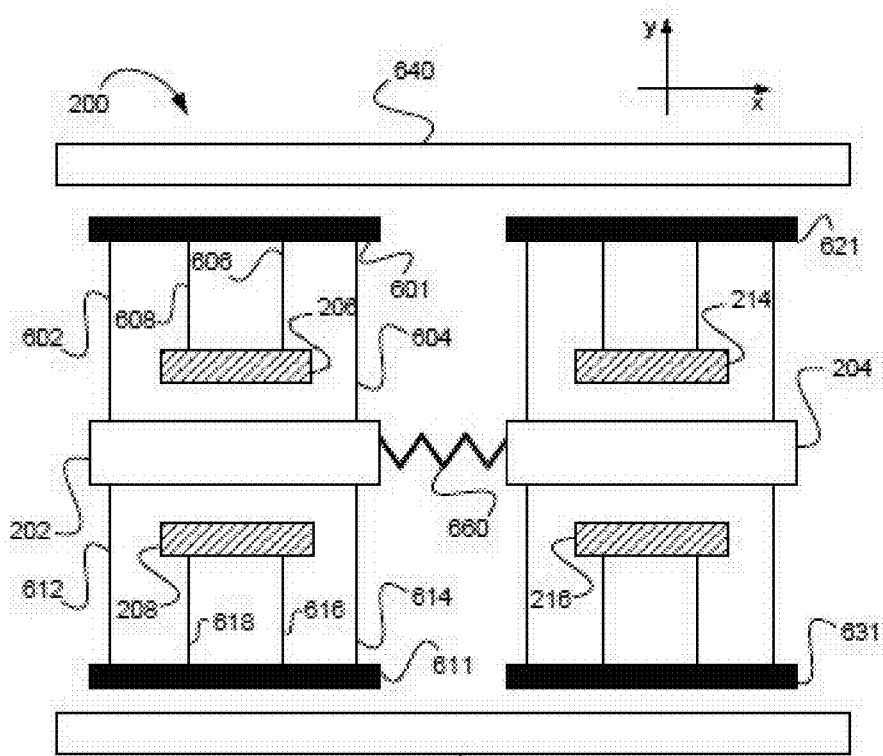
FIG. 3b is a schematic drawing illustrating some embodiments of the present invention, in which two proof masses are suspended using folded suspensions and are actuated by an electrostatic force directed along the beams, such that the motion of the proof masses is limited to a single axis.

Referring now to the drawings, FIGS. 3a and 3b show schematically the gyroscope device 200 in accordance with two embodiments of the present invention. Generally, the gyroscope device 200 of the invention includes at least one pair of proof masses 202 and 204 which are coupled to anchors via an arrangement of suspended flexible beams and are associated with electrodes to be actuated/excited by application of electrostatic or magnetic force. The periodically induced deformation (tension) of the flexible beams causes parametric excitation, due to the periodic variation of the effective stiffness of the beams. The configuration is such that the beam is at its one end attached to the fixed anchor, and at the other "free" end is coupled to the proof mass. The electrostatic force may be applied by using direct voltage difference supply between two electrically conductive proof masses or via the use of electrodes. The latter may include a so-called "internal" or "central" electrode located between the proof masses (FIG. 3a), or external electrodes (FIG. 3b). The proof masses are spaced from one another either along an axis substantially parallel to the main beam axis (FIG. 3a) or along an axis substantially perpendicular to the main beam axis (FIG. 3b).

Thus, in the embodiment of FIG. 3a, the device 200 includes a pair of proof masses 202 and 204 spaced apart from one another along x-axis. Each proof mass is coupled to or more (preferably two or more) suspension beams—by two beams 210-212 (218-220) in the present not limiting example—and is directly connected to one or more anchors at one side of the proof mass via said beams—two anchors 206-208 (214-216) in the present example. As shown in the figure by dashed lines, a central electrode 300 may be provided between the proof masses. Also provided in the device 200, although not specifically shown here, is a power supply which creates the electrostatic force by charging the two proof masses and the electrode if used. The application of the electrostatic force causes periodic modulation of the tensile force within the beams, which in turn results in the proof masses oscillatory movement along the y-axis through the parametric resonance mechanism. The movement of the proof masses along the x-axis is practically negligible as compared to that of the y-axis. When the entire device 200 is rotated about the x-axis, the drive mode movement along the y-axis causes Coriolis force along the z-axis (into and/or out of the page), and therefore sense mode movement along the z-axis as described above. Hence, the device rotation about the x-axis can be determined.

It should be noted that in the above discussion, the drive and sense modes of the device 200 were described for the non-limiting example in which the rotation to be detected is around the x-axis. However, this is only an example, and the drive mode motion, sense mode motion, and rotation axes may differ, as will be shown below.

Figure 7:
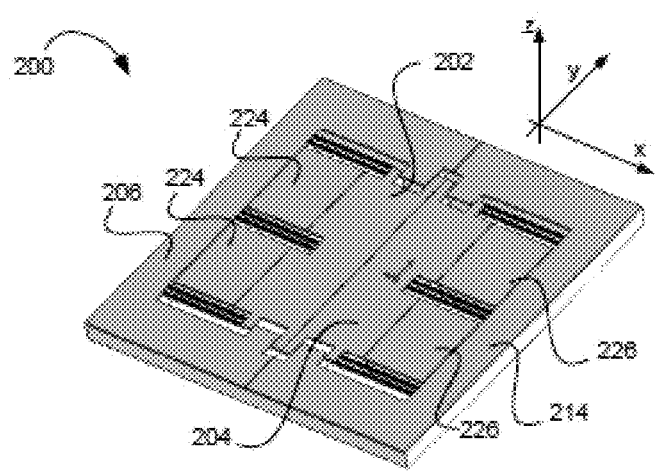

In fact, in some embodiments of the present invention, the drive motion may be both in the y-axis (in-plane) and in the z-axis (out-of-plane), such that the natural frequencies of the out-of-plane and of the in-plane motion are matched or have a small split. The rotation of the device along the x axis gives rise to the Coriolis force, which affects the out-of-plane motion and therefore and results in the change of the phase between the in-plane and the out-of-plane motions. The change of phase can be measured (or calculated by using measured characteristics of the in-plane and out-of-plane motions), and can be used to calculate the Coriolis force, and therefore the rate of rotation of the device 200. An example illustrating such embodiment is shown in FIG. 7.

Figure 15:
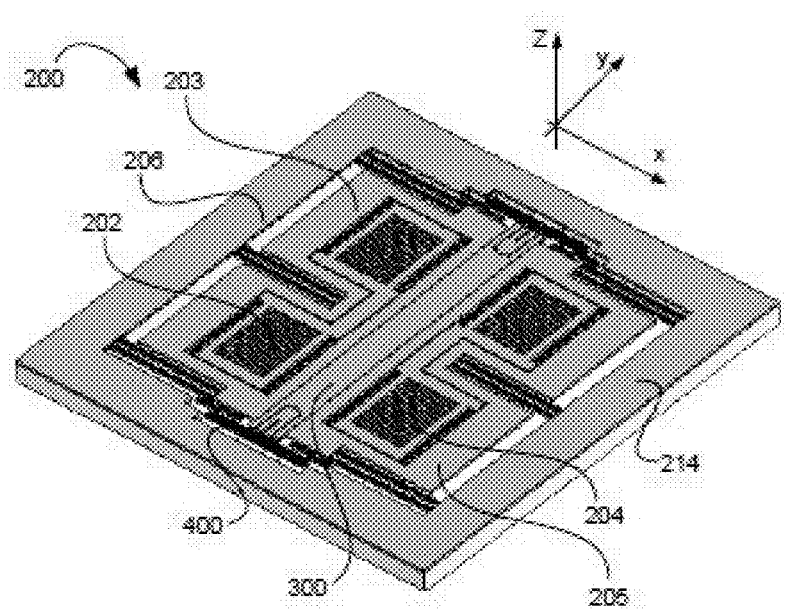
FIG. 15 is a perspective drawing illustrating mechanically coupled proof masses suspended using initially straight beams and performing in-plane motion in a sense mode, according to the present invention.
Figure 16:
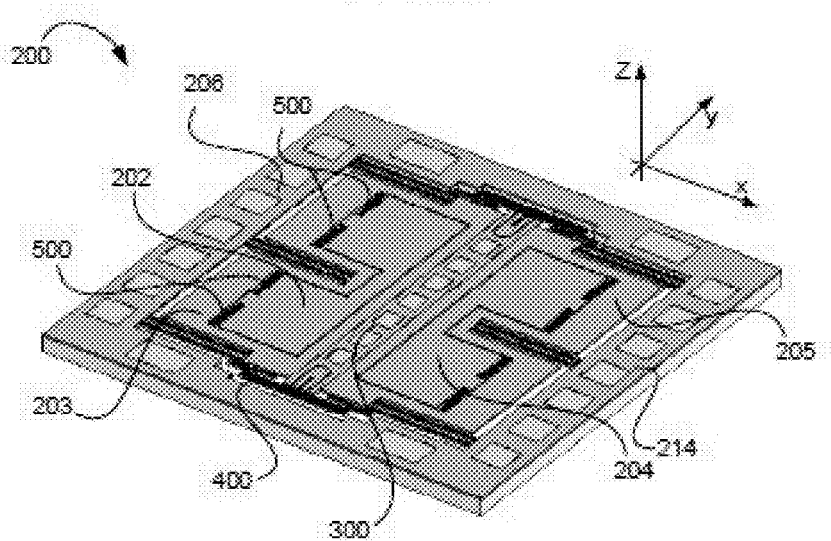
FIG. 16 is a perspective drawing illustrating mechanically coupled proof masses suspended using initially straight beams and performing out-of-plane tilting in a sense mode, according to the present invention.

Moreover, in some embodiments of the present invention, the proof masses are enclosed by frames, and joined to the frames such that the proof masses can move in a certain manner relative to their respective frames. In this manner, while the frames move in the drive mode, the proof masses within the frames can move in the sense mode with respect to the frames. This enables, for example, detection of rotation around the z-axis, where the drive-mode motion is mostly in the y-axis, while the sense-mode motion is in the x-axis, as shown in FIG. 15. In another example, rotation around the x-axis is detected, where the drive-mode motion is mostly in the y-axis, while the sense-mode motion is a tilting in the x-z plane, as shown in FIG. 16.

In the example of FIG. 3b, the device 200 includes a pair of proof masses 202 and 204 spaced apart from one another along the x-axis. Here, each proof mass 202 (204) is coupled to a pair of its associated anchors 206, 208 (214, 216) which are located at opposite sides of the proof mass. Also, in this embodiment, the proof mass is connected to the associated anchors not directly (as in the example of FIG. 3a) but via connection to electrodes 601, 611 (621, 631). The connection forms so-called folded suspension. Further provided in this device are two more external electrodes 640 and 650. The configuration is such that the external electrodes 640 and 650 are stationary mounted (fixed) with respect to the anchors, similar to that of central electrode 300 (if any) in the device of FIG. 3a, while electrodes 601, 611, 621, 631 are mounted for movement predominantly along the x-axis. Application of electrostatic force to the electrodes causes periodic modulation of the tensile force within the beams, which in turn results in the proof mass movement along the x-axis (due to the flexibility of the suspension beams) through the parametric resonance mechanism. The operation of such device will be exemplified below with reference to FIGS. 17-19. Also provided in the device, although not specifically shown here, is a power supply which creates the electrostatic force.

The setup of FIG. 3b enables detection of the rotation around the in-plane y-axis, the out-of plane z-axis, or both. As will be shown in FIGS. 17-18, rotation around the y-axis can be detected in two manners: (i) by inducing a drive-mode motion along the x-axis and measuring a sense-mode motion in the z-direction; (ii) by inducing a drive-mode motion in the x-z plane, where the frequencies of the motions along the x-axis along the z-axis are matched, and measuring a sense-mode motion in the z-axis to determined a phase difference between the motions in the x-axis and y-axis.

Figure 19:
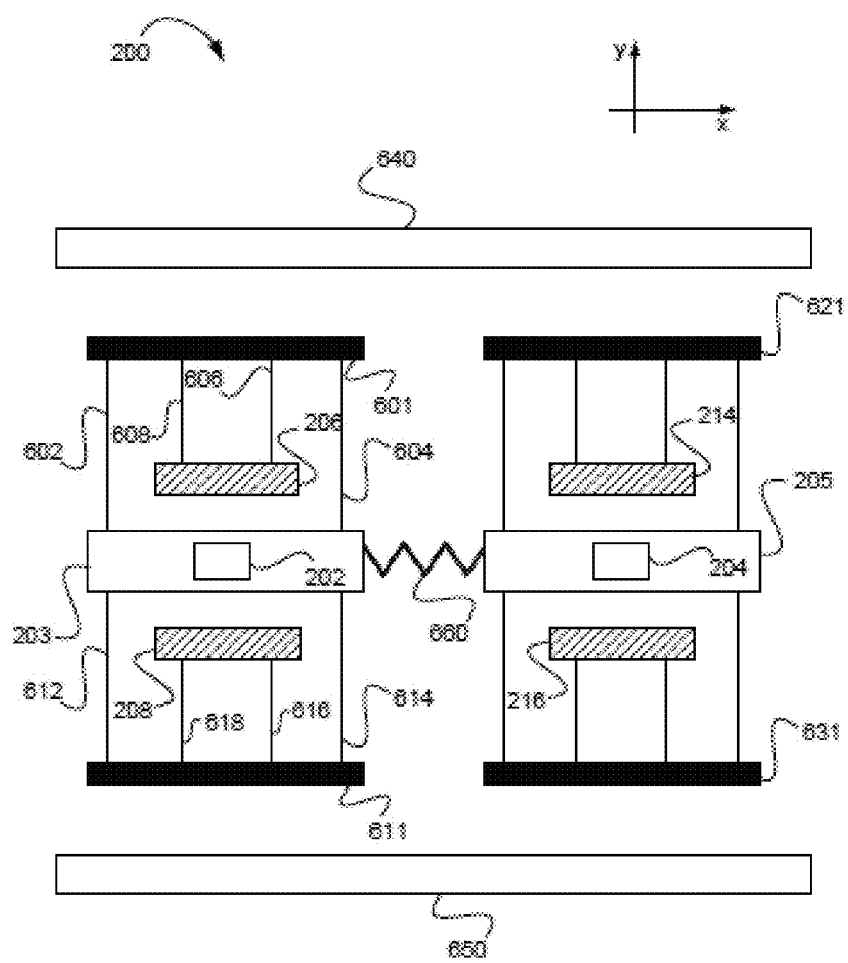
FIG. 19 is a block diagram illustrating some embodiments of the present invention, in which the in-plane motion of the proof masses is limited to a single axis, where the sense-mode motion and the drive-mode motion are separated, enabling easier detection of the sense mode motion.

Moreover, as will be shown in FIG. 19, in some embodiments of the present invention, the proof masses are enclosed by frames, and joined to the frames such that the proof masses have at least one degree of freedom with respect to their corresponding frames. In this manner, while the frames move in the drive mode, the proof masses within the frames can move in the sense mode with respect to the frames. This enables, for example, detection of rotation around the z-axis, where the drive-mode motion is in the x-axis, while the sense-mode motion is in the y-axis. In another example, rotation around the y-axis is detected, where the drive-mode motion is in the y-axis, while the sense-mode motion is a tilting in the y-z plane.

Optionally, the device of FIG. 3a or 3b is associated with a measuring unit (not shown), for extracting one or more parameters of the sense-mode oscillatory motion. The parameters may include any one of velocity, amplitude, period, and phase with respect to the sense-mode oscillatory motion, for example. These parameters can be used to calculate the angular rate. The measuring unit may be based on capacitive, magnetic, optical, piezoelectric, piezoresistive or tunneling type sensor. Specifically, in the case of capacitive sensing, sensing electrodes can be located on the substrate below or above the proof masses. In a variant, the extraction of the parameter(s) of the sense-mode motion is be performed by measuring the motion of the proof masses both in the drive mode and the sense mode, and then using predetermined algorithms to separate the sense-mode motion and its parameter(s). In another variant, if the sense-mode motion and drive mode-motion are along different axes, the extraction of the sense-mode parameter(s) can be performed by directly measuring only the sense-mode motion and determining its parameters.

The following are some specific but not limiting examples of the device configuration of FIG. 3a.

Figure 4:
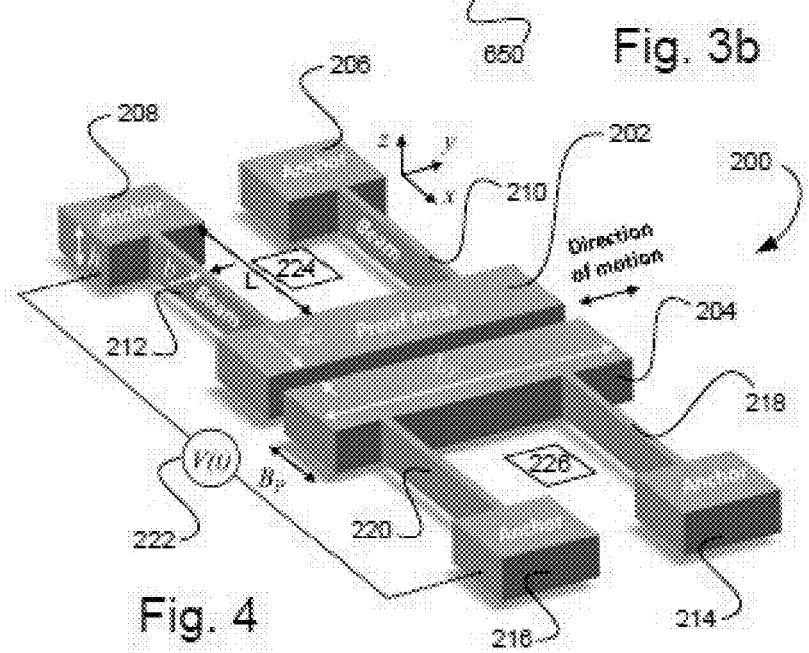
FIG. 4 exemplifies some embodiments of the present invention, in which two proof masses are electrostatically coupled to each other.

FIG. 4 exemplifies a device of the present invention, in which two proof masses are electrostatically coupled to each other.

The frame-type gyroscope structure 200 of the present invention is shown. The structure 200 includes a pair of proof masses 202 and 204 (generally, at least one such pair of proof masses). Each proof mass is joined to at least one corresponding anchor via at least one flexible clamped-guided beam. In FIG. 4, the proof mass 202 is joined to the anchors 206 and 208 via flexible beams 210 and 212, respectively. Similarly, the proof mass 202 is joined to the anchors 214 and 216 via flexible beams 218 and 220, respectively. The length, height and width of the beams are designated L, h and b, respectively. The length and the width of the proof masses are designated $L_P$ and $B_P$ respectively. The structure 200 can be manufactured as an integrated semiconductor device. The height of the proof masses and of the beams is defined by the height of the device layer of silicon on insulator (SOI) wafer, which is used for the fabrication of the device. The proof masses are separated by a space/gap $g_0$ in such a way that each part of the devices (each of the proof masses) is electrically disconnected/insulated from the other.

The proof masses 202 and 204 are actuated by one or more actuating units configured to provide a voltage supply. Generally, an actuation voltage is applied to the proof masses and/or one or more electrodes, such that potential difference is created between the proof masses. The voltage may contain both steady (dc) and time dependent (ac) components, or only ac component. The electrostatic force acts along the main axis of the beams (x axis) and results in a periodic tensile force applied to the beams' ends, while the beam is interconnected between the proof mass and the anchor. This leads to the periodic variation of the effective flexural stiffness of the beams and consequently to parametric excitation of the device 200. In some embodiments of the present invention, voltage is applied to both proof masses by a power source 222 (e.g. battery, or power supply) electrically connected to both proof masses, which serve as electrodes. In this case, the voltage may be applied to the anchors, if the beams and anchors are electrically conductive.

In the case when b=h, the device performs predominantly sense-mode motion within the x-y plane. Note, however, that by using an appropriate ratio between the width and the height of the beams, sense mode motion can occur both in-plane (within the x-y plane) and out-of-plane (along the z axis), enabling excitations of both in-plane and out-of plane oscillations by the actuating units. This type of orbital motion along an elliptic trajectory is used in one of the configurations of the angular rate sensor as will be described later with reference to FIG. 15.

In some embodiments of the present invention, the in-plane motion (within the x-y plane) corresponds to the drive mode of the device. It should be noted that the desired mode of the vibration is such that the proof masses move in the opposite directions (in the anti-phase). In the framework of the most basic scenario, the presence of the angular rate associated with the rotation around the in-plane x axis results in the presence of the Coriolis force acting on the proof masses in the out-of-plane axis. As explained above, this force results in the out-of-plane vibrations (corresponding the sense-mode vibrations, in these embodiments of the present invention) of the proof masses while the amplitude of these vibrations is proportional to the Coriolis force and consequently to the angular rate.

The specific operational scenarios of the sensor depend on the device architecture and the design realization and will be discussed further below. It should, however, be noted that in all cases, the device is of a tuning-fork type, where the proof masses of at least one pair are coupled through the electrostatic or mechanical force and excited parametrically by means of a direct modulation of the stiffness of the suspension beams. As explained above, the parametric excitation of the drive mode vibration gives rise to large-amplitude vibrations in the drive mode, where the maximal amplitude is reached in a short time (settling time). This leads to large-amplitude vibrations and shorter settling time in the sense mode vibrations. In this manner, an increased sensitivity and an increased bandwidth (decreasing response/settling time) of the gyroscope can be achieved. Parametric excitation of a single mass was demonstrated experimentally in "S. Krylov, Y. Gerson, T. Nachmias, U. Keren, Excitation of large amplitude parametric resonance by the mechanical stiffness modulation of a microstructure. *J. Micromech. Microeng.* 20 (2010) pap. 015041". In these devices, vibrations amplitudes of the order of 100-200 μm can be reached, which is order of magnitude larger than in the devices known in the art. The settling time achieved by the structure of the present invention is of the order of several milliseconds.

Therefore, the device of the present invention provides coupled, large amplitude, anti-phase motion of the proof-masses, which increases the sensitivity and decreases the response time (i.e. increases bandwidth) of the Coriolis-force-based rate sensing.

In some embodiments of the present invention, on or more internal (224, 226) electrodes are provided between at least one of the proof masses and its corresponding anchor. These electrodes are generally used to attract the corresponding proof masses toward the corresponding anchor, and therefore to create a compressive force on the beams. In this manner, besides the varying tensile force applied to the beams by the actuating electrodes (as the proof masses attract each other), an independent compressive force can be applied to the proof masses, in order to tune the resonance frequency of the device. The tuning of the frequency is based on the following considerations. Application of a tensile force to the beam increases the beam's resonance frequency (similarly to the application of higher tension to a piano string, which results in higher tone); whereas application of a compressive force to the beam reduces the beam's resonant frequency. It should be noted that the actuating force between electrodes (proof masses) is always tensile, since the attraction between the proof masses increases the tension of the beams. The application of the tensile force by the actuating electrodes is therefore coupled with the actuating. On the other hand, the application of the compressive force by the internal electrode(s) is decoupled from the actuation and allows an efficient tuning of the device's frequency.

The internal electrodes (224, 226) are powered by one or more power sources (not shown), which are independent from the power source 222 powering the actuating electrodes (i.e. proof masses 202 and 204). Generally, an actuation voltage is applied to the internal electrodes, such that a potential difference is created between each internal electrode (224 or 226) and its respective proof masses (202 or 204, respectively). The voltage is generally a steady (dc) voltage.

The architecture of the device 200 has several advantageous features. The suspension incorporating a pair of clamped-guided beams is compliant mainly in the lateral axis (the main axis of the beams). This feature combined with the parallel-plate architecture of the proof masses extending along an axis substantially parallel to the axis of motion allows large-amplitude vibrations in the y axis. In contrast, in the conventional case of parametric excitation by a parallel-plate electrode located in close proximity to a beam, the amplitudes of the motion in the direction toward the electrode are limited by the electrostatic gap. Since in the device of the present invention the motion of the plates is predominantly along the y axis the change in the distance between the two plates during the motion is relatively small. In addition, devices known in the art and actuated by parallel-plate electrodes suffer from very high damping due to the squeezing of a thin layer of air between two approaching electrodes (a phenomenon commonly known as highly nonlinear squeeze film damping). In the device disclosed here, since in the motion is predominantly along the y axis and the change in the distance between the electrodes during the motion is small, the structure's dynamics are less influenced by highly nonlinear squeeze film damping, which is usually the leading damping factor limiting vibration amplitudes of electrostatic structures actuated by parallel plate electrodes.

In addition, electrostatically actuated structures often suffer from electrostatic pull-in instability, which occurs when one or two electrodes collapse toward each other resulting in the electrical short and failure of the device. The architecture of the device of the present invention enables, to a large extent, to overcome this difficulty, due to the high stiffness of the suspension in the axial x direction which prevents the motion of the proof mass toward the electrodes (or toward another mass) and therefore greatly decreases the occurrence of pull-in instabilities. This is because the voltages required to cause a mechanical failure of the suspension beams in tension (of the order of tens of thousands of volts for the realistic device parameters) or of the proof masses in bending are probably beyond the operational range limited by the breakdown voltage, which typically corresponds to a field of a few tens of V/µm for the electrostatic gap of 5-10 µm.

Moreover, if internal electrode(s) applying compressive force on the beams are present, the architecture of the device 200 enables the tuning of the resonant frequency of the device.

Figure 5:
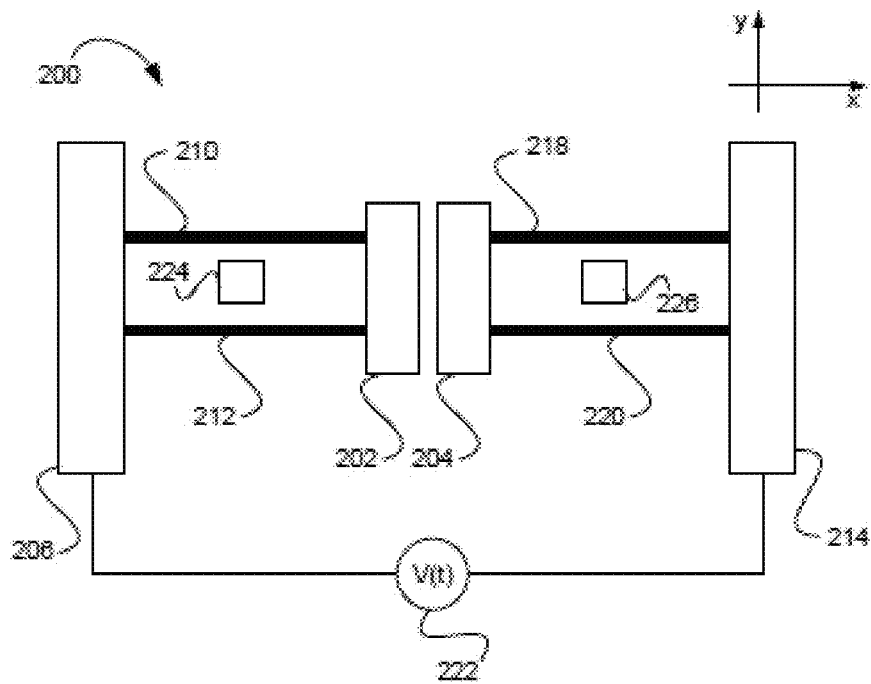
FIGS. 5-7 illustrate some embodiments of the present invention, in which two proof masses are actuated by each other, where the support beams are initially straight.
Figure 6:
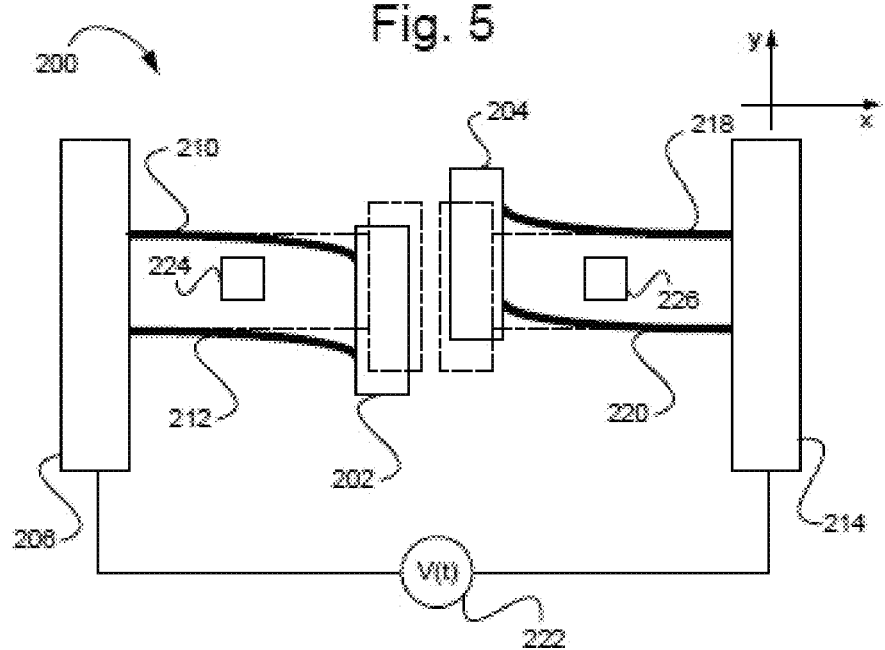

Referring now to FIGS. 5-6, the operation of the device of the invention, constructed generally as described above, is illustrated, where two proof masses are actuated by each other, and where the support beams are initially straight.

In FIG. 5, the device 200 is at rest. In other words, the voltage at the proof masses 202 and 204 is either dc voltage (constant in time) or zero. At such rest state of the device, the beams 210, 212, 218, and 220 are straight. It should be noted that though in the example of FIG. 5 two beams are used to suspend each proof mass to its corresponding anchor, any number of beams (for example, one, three, or more) can be used for this purpose.

In FIG. 6, the voltage applied to the proof masses 202 and 204 is varied. When this happens, the beams' stiffness is changed periodically, to cause parametric excitation of the device, thereby causing the proof masses to move in the y-axis (drive-mode motion), i.e. perpendicular to the main axis of the beams. One of the natural vibrational modes of the system, excited by the parametric resonance, is such that the proof mass 202 is moved downward (negative y-direction), and the proof mass 204 is moved upward (positive y-direction), and/or vice-versa. In this manner, the motion of the proof masses is anti-phase and a tuning-fork mode is achieved.

Since the voltage changes periodically, the proof masses 202 and 204 move in an oscillatory manner between their respective positions of FIGS. 5 and 6. The motion along the x-axis is much smaller than the motion along the y-axis. Specifically, the relation between the axial motion u in the x-axis and the lateral motion v in the y axis is such that $u=3$ $v^2/5$ L, where L is the length of the suspension beams. For example, if $v=100$ µm and $L=2000$ µm, we obtain $u=3$ µm. Therefore, the motion along the y-axis provides the highest contribution toward the sense mode motion (corresponding in this example to out-of-plane motion into and out of the page) generated by the Coriolis force. The oscillatory motion of the proof masses is parametrically excited by the periodic change in stiffness of the beams, and therefore can quickly achieve the resonance condition (high-amplitude vibration), when the voltage is changed at the resonant frequency of the device 200. The coupling between the proof masses is achieved through the electrostatic force acting between two masses.

Reference is made to FIG. 7 showing a more specific implementation of the device of FIG. 4, in which the device 200 is used to measure a rotation around the x-axis. In the example of FIG. 7, the device 200 contains two proof masses (202 and 204) each suspended using three pairs of initially straight clamped-guided beams. The provision of three pairs of beams reduces undesirable rotations of the proof masses around the out-of-plane axis (z). In this specific but not limiting example, each of the beams is 2500 µm long, 25 µm wide and 70 µm high. The distance between the proof masses (the electrostatic gap) is 7 µm, the length of the electrode within the proof masses is 7000 µm.

Internal electrodes 224 and 226 are provided at the internal side of each proof mass in order to create a compressive force and, if necessary, to have an ability to tune the resonance frequency of the device, as explained above with reference to FIG. 4.

In some embodiments, the drive-mode motion is along the y-axis, while the sense-mode motion is along the z-axis, as described above. In other embodiments of the present invention, the drive-mode motion is both in the y-axis and in the z-axis, as will be now explained. In such case, the width of the suspension beams is chosen in such a way that the natural frequencies of the out-of-plane and of the in-plane motion are matched or have a small split. Thus, the in-plane parametric actuation is accompanied by the actuation of the out-of-plane motion in the drive mode. As a result, each of the proof masses performs an elliptical motion in the drive mode. The presence of the angular rate results in the appearance of the Coriolis force (which is in phase with the velocity of the in-plane vibrations), which affects the out-of-plane motion and causes a change of the phase between the in-plane and the out-of-plane motions. The measurement of this change of phase (or the calculation thereof via measured characteristics of the in-plane and out-of-plane motions) can be used to calculate the Coriolis force, and therefore the rotation of the device 200 (which corresponds to the rotation of the object to which the device 200 is anchored/joined).

Figure 8:
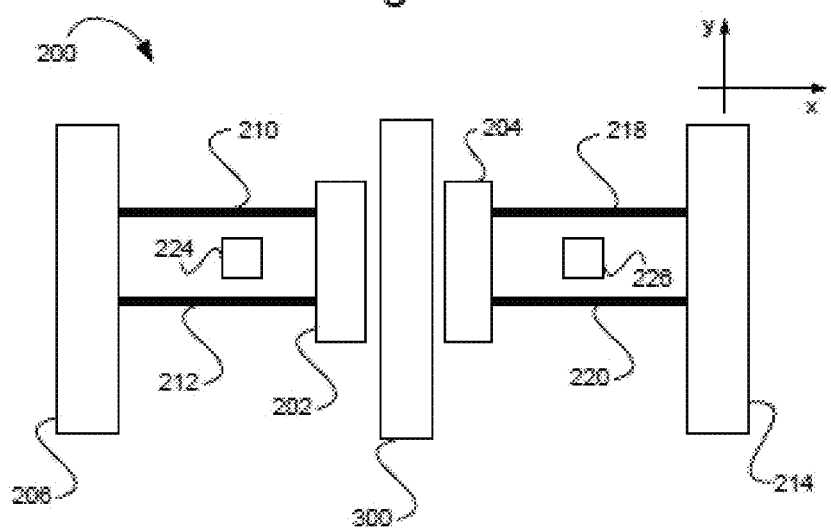
FIGS. 8 and 9 exemplify some embodiments of the present invention, in which two proof masses are actuated separately by a central electrode.

FIG. 8 illustrates schematically the operation of the above device of another example of the invention, which is generally similar to that FIGS. 4 to 7, and in which two proof masses are actuated separately by a central electrode.

The device 200 operation is similar to that shown in FIG. 5. However, in the example of FIG. 8 a central electrode 300 is provided being located between the proof masses 202 and 204. It should be noted although not specifically shown here that the device is appropriately connected to a power supply associated with a control unit which operates to provide proper time modulation of the voltage to the central electrode 300, and the proof masses 202, 204 so as to achieve an oscillatory, anti-phase (tuning-fork) motion of the proof masses with respect to each other. Therefore, each of the proof masses is actuated independently and the masses are decoupled or weakly coupled acoustically through the waves propagating between the anchors within the substrate.

Figure 9:
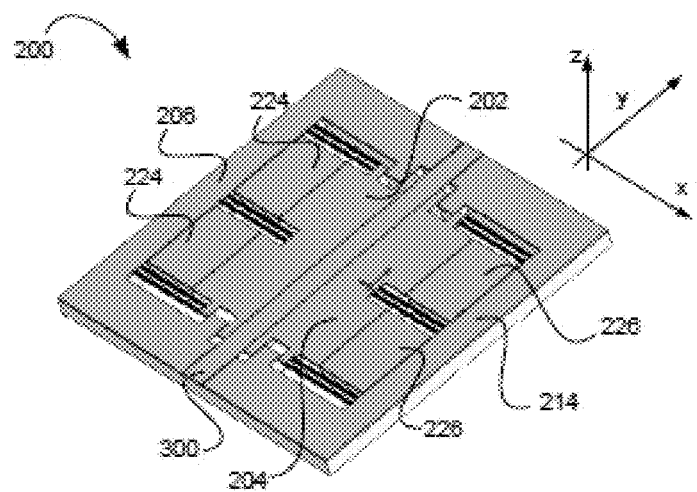

FIG. 9 shows a possible implementation of the device 200 of FIG. 8. As indicated above, this device is configured generally similar to the device of FIG. 7, except for the fact the device 200 of FIGS. 8 and 9 includes the central electrode 300.

Figure 10:
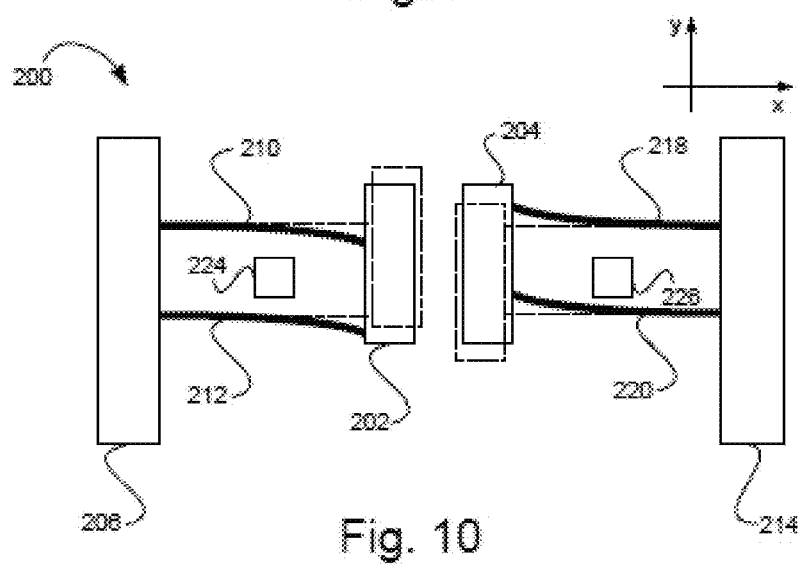
FIGS. 10-12 illustrate a gyroscope in which the proof masses are suspended using initially curved beams, according to some embodiments of the present invention.
Figure 11:
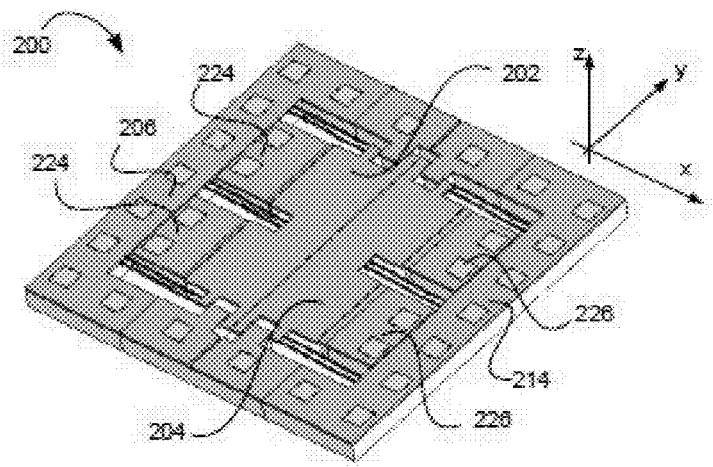
Figure 12:
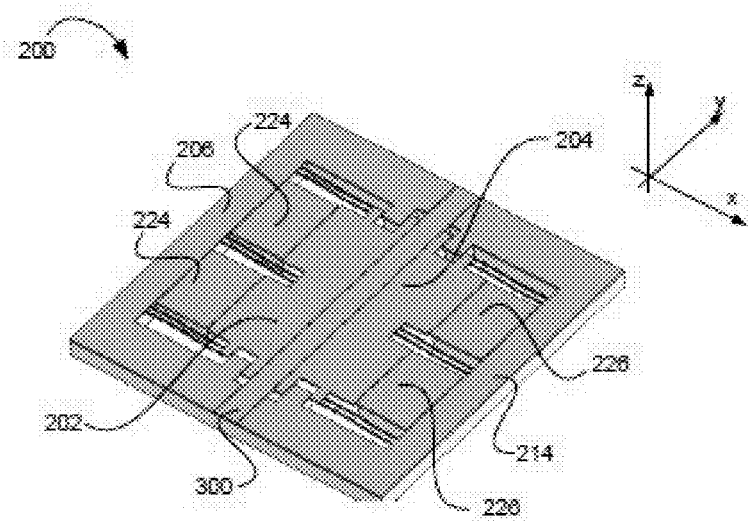

Referring now to FIGS. 10-12, there are illustrated yet further examples of a gyroscope of the invention, where the example of FIGS. 10-11 is generally similar to FIG. 4 (i.e. no central electrode) and the proof masses are suspended using initially curved beams, and the example of FIG. 12 is similar to that of FIGS. 8-9 but with the proof masses being suspended using initially curved beams.

In FIG. 10, the beams 210, 212, 218, and 220 of the device 200 are initially curved, i.e. are curved when the device 200 is at its rest state. When voltage is applied (or changed), the proof masses (electrodes) 202 and 204 attract each other, and cause the beams to straighten, as shown by the dotted lines. Periodic variation of the voltage gives rise to anti-phase oscillatory motion of the proof masses, and parametric excitation, as described above. As will be explained below, in addition to the achievement of parametric excitation, the device 200 with initially curved beams may be used in order to achieve parametric amplification as well.

The suspension based on the curved clamped-guided beams has several beneficial features. First, the coupling between the masses is enhanced in such a way that the desired anti-symmetric mode is excited. The reason is that when a tensile force is applied to the masses, the straightening of the beams is such that the masses move in the anti-phase manner. In addition, the application of a steady, time independent dc component of the voltage (e.g., via the internal electrodes 224 and 226, if present) allows an efficient tuning of the resonant frequency of the device.

In addition, the equations governing the dynamics of the system, although of a parametric type and containing time-dependent stiffness coefficients, are non-homogeneous and contain also a direct forcing term associated with the curvature (see S. Krylov, Y. Bernstein, "Large displacement parallel plate electrostatic actuator with saturation type characteristic", Sensors and Actuators A 130-131 (2006) 497-512). This allows simple implementation of parametric amplification of the device to reach higher vibrational amplitudes. The advantage of this configuration based on a curved beam lies in the fact that its dynamics are described by the equation containing both direct actuation and parametric actuation in a single equation. To reach parametric amplification and high amplitudes, the actuation voltage of appropriate frequency and phases should be applied by the electrode (e.g., see J. Rhoads, N. J. Miller, S. W. Shaw, B. F. Feeny, "Mechanical domain parametric amplification", J. Vibrations and Acoustics, 2008, Vol 130, pp. 061006-1-061006-7).

In this regard, it should be clear that parametric amplification and parametric excitation are different concepts. Parametric excitation brings about a sharper transition from low-amplitude non-resonance to high-amplitude resonance condition, as explained above. Parametric amplification, in contrast, brings about a general increase in the amplitude of drive-mode oscillation, both in resonance and non-resonance conditions. This increase in the amplitude of motion in the drive mode brings about an increase in the amplitude of sense-mode motion. While parametric excitation can be achieved by all the embodiments of the present invention, parametric amplification can be easily achieved only by the embodiments of the present invention in which the beams are initially curved.

FIG. 11 is a perspective drawing illustrating the device 200 at its rest state, with initially curved beams, and electrostatically coupled proof masses. In FIG. 12, the device 200 is at its rest state, with initially curved beams, and has a central electrode 300 to actuate the proof masses.

Figure 13:
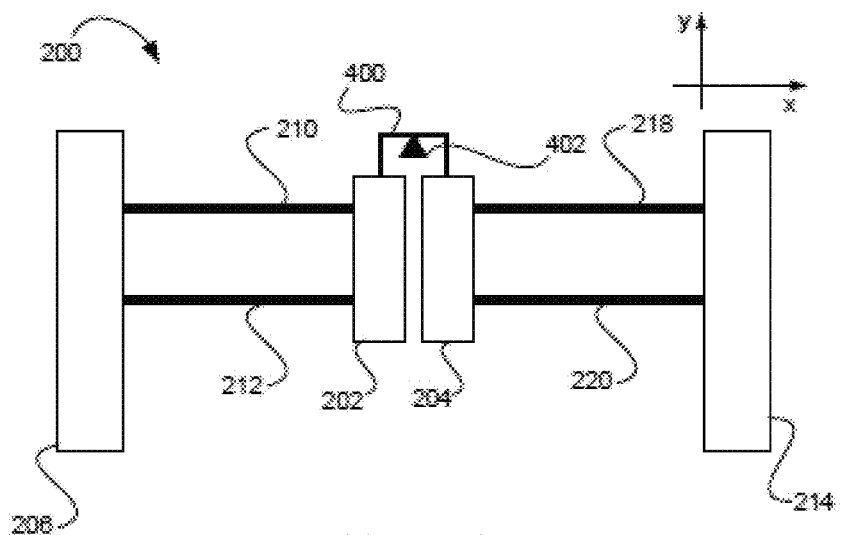
FIGS. 13-14 are block diagrams exemplifying some embodiments of the present invention, in which the proof masses are mechanically coupled via a swing.
Figure 14:
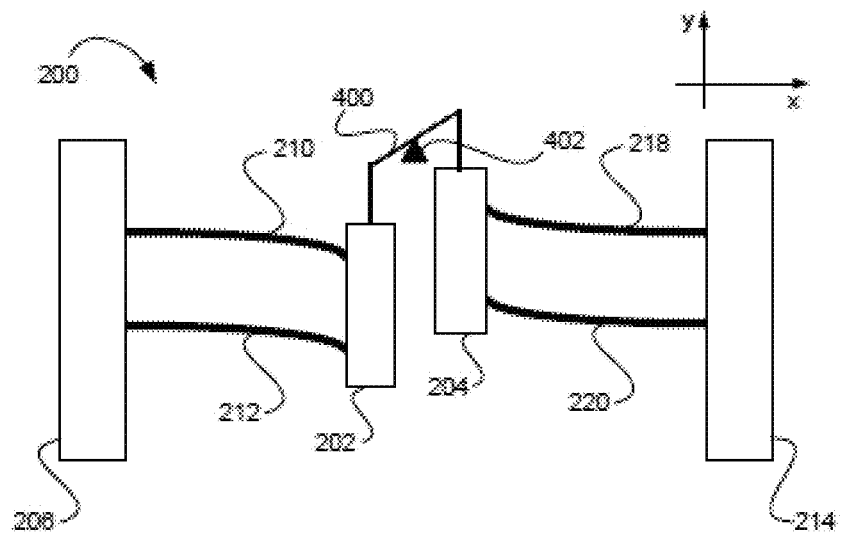

Referring now to FIGS. 13-14, there is schematically illustrated yet a further embodiment of the present invention, which is configure generally similar to that of FIG. 4-6, 8, or 10 but in which the proof masses are mechanically coupled to each other via a swing to ensure anti-phase operation.

In FIG. 13, the beams of the device 200 are in their straight state. In FIG. 14, the beams of the device 200 are in their curved state. It should be noted that if the beams are initially straight at the rest state, then FIG. 13 illustrates the rest state of the device 200. If the beams are initially curved at rest state, then FIG. 14 illustrates the rest state of the device 200.

The device 200 of FIGS. 13-14 is similar to the device 200 of FIG. 4. In addition, the device of FIGS. 13-14 include a swing 400 attached to the proof masses 202 and 204 and to an anchored pivot 402. The swing 400 can rotate on the x-y plane (in-plane motion) about the pivot 400. In this manner, when the proof mass 202 moves in one direction (e.g., downwards, as shown in FIG. 14), the arm of the swing 400 which is on the side of the mass 202 is pushed in the same direction (e.g., downwards), while the arm on the side of the mass 204 moves in the opposite direction (e.g. upwards) because of the swings rotation about the pivot 402. In this manner, the mass 204 is pulled upwards by the swing 400. Therefore, the swing 400 mechanically couples the proof masses, in order to enhance the anti-phase movement of the proof masses with respect to each other.

The proof masses of the device 200 of FIGS. 13-14, may be actuated independently by corresponding electrodes, may actuate each other (i.e. by acting as electrodes, as shown in FIG. 4), or may be actuated via a central electrode located between the proof masses (as shown, for example in FIG. 8)

Referring now to FIG. 15, a perspective drawing illustrates yet another example of the device of the invention, in which mechanically coupled proof masses are suspended using initially straight beams, and in distinction to the above described examples the device is intended to perform in-plane motion in a sense mode.

In the device 200 of FIG. 15, the proof masses 202 and 204 are located within respective frames 203 and 205, which are actuated separately using a central electrode 300. The proof mass 202 (204) is joined to the respective frame 203 (205) by one or more compliant beams, which enable a motion of the proof masses 202 (204) in the x-axis. The frames 203 and 205 are joined to their respective anchors 206 and 214 via three sets of beams. The mechanical coupling between the frames (and therefore between the proof masses) is provided by a mechanical swing 400 (as shown in S. A. Zotov, I. P. Prikhodko, A. A. Trusov, and Andrei M. Shkel, Frequency modulation based angular rate sensor, *Proc. IEEE MEMS*, Cancun, Mexico, Jan. 23-27, 2011, pp. 577-580). The swing 400 is attached to the substrate by a cantilever-type beam and is attached to each of the frames by a serpentine spring. Calculation show that the presence of the swing assures the excitation of an anti-symmetric drive mode, as desired. According to some simulations performed by the inventors, the frequencies for both the sense and drive modes are 1000 Hz.

In FIG. 15, the drive mode motion is predominantly in y-axis. The rotation of the platform (and therefore of the device 200) is about the out-of-plane z-axis, and therefore, the sense mode vibration is associated with the in-plane motion along the x-axis. Note that during the high amplitude drive mode motion along the y-axis, each frame (and therefore each proof mass) performs also small motion in x-axis (as mentioned above). Actually each frame and with it the proof mass moves along an arch-shaped trajectory, which is very elongated in the y-axis. As a result, a centrifugal force generated by the arch-shaped motion acts on the proof masses in the sense mode along the x-axis, in addition to the Coriolis force. However, the frequency of this centrifugal force is twice the frequency of the Coriolis force. Since the in-plane (x-axis) resonant frequency of the proof-masses is matched with the frequency of the drive mode and therefore with the frequency of the Coriolis force, the centrifugal force is non-resonant and does not result in the excitation of large amplitude vibrations in the sense mode. Moreover, since the frequencies of the Coriolis force and the centrifugal force are different, the response engendered by the centrifugal force can be easily filtered out via suitable algorithms.

A second centrifugal force generated by the rotation of the device 200 around the z-axis also acts along the x-axis. However, the effect of this second centrifugal force on the motion of the proof masses is negligible when compared to the effect of the Coriolis force (less than $\frac{1}{1,000,000}$), and therefore need not be considered.

It should be noted that the device of FIG. 15 may also be used for detecting rotation around the x-axis and z-axis simultaneously. As explained above, rotation around the x-axis would cause the frames and the proof masses together along the z-axis in sense mode. Therefore, detection of the motion of the frames and proof masses in the z-axis would enable determination of the rotation around the x-axis, while detection of the motion of the proof masses in the x-axis would enable determination of the rotation around the z-axis.

In the case in which it is desirable that the device of FIG. 15, detects only rotation along the z-axis, a suitable stiffness and shape of the beams (and optionally the stiffness of the spring and the serpentine spring) is selected, so that to a motion of the frames and proof masses in the z-axis is significantly decreased or eliminated, while motion in the x and y axes is allowed.

Referring now to FIG. 16, a perspective drawing illustrates yet further example of the invention where the mechanically coupled proof masses are suspended using initially straight beams and performing out-of-plane tilting in a sense mode.

In the device 200 of FIG. 16, is similar to the device of FIG. 15. However, in the device of FIG. 16, the proof masses 202 and 204 are coupled to their respective frames 203 and 205 by hinges 500 located on a single side of each proof mass. Therefore, a possible motion of the proof masses 202 and 204 relative to their respective frames is an out-of-plane tilting along the x-z plane, where the motion along the z-axis is generated by Coriolis force. Therefore, when the rotation of the device 200 is about the main axis of the suspension beams (x-axis), the proof masses perform out-of-plane tilting motion (in the x-z plane) around the y-axis in the sense mode in response to the Coriolis force and to the drive-mode motion in the x-y plane (mainly in the y-axis). The advantage of this arrangement over that of FIG. 15 is in that the influence of the centrifugal force generated by the arch-shaped motion on the sense mode motion is completely eliminated in the device of FIG. 16, since the sense motion in the x-z plane is not affected by the centrifugal force acting along the x-axis.

In some embodiments, the hinges 500 further enable the proof masses 202 and 204 to move along the x-axis, as explained above, with reference to FIG. 15. In this case, a two-axis gyro, which is able to simultaneously measure rotations about both x and z axes, can be implemented. This is achievable since in this case, each proof mass has two degrees of freedom—in-plane motion mostly along the x-axis (sense motion for the rotation about z axis) and tilting motion (sense motion for the rotation about x axis). Therefore, a single drive mode motion (mostly in the y-axis) can be used to generate two separate sense mode motions, each corresponding to a rotation around a different axis. This enables separation between sense-mode and drive-mode motion, as the proof masses move in sense mode, while the rest of the device moves in drive mode. Therefore, the sense-mode motion is easier to detect.

Figure 17:
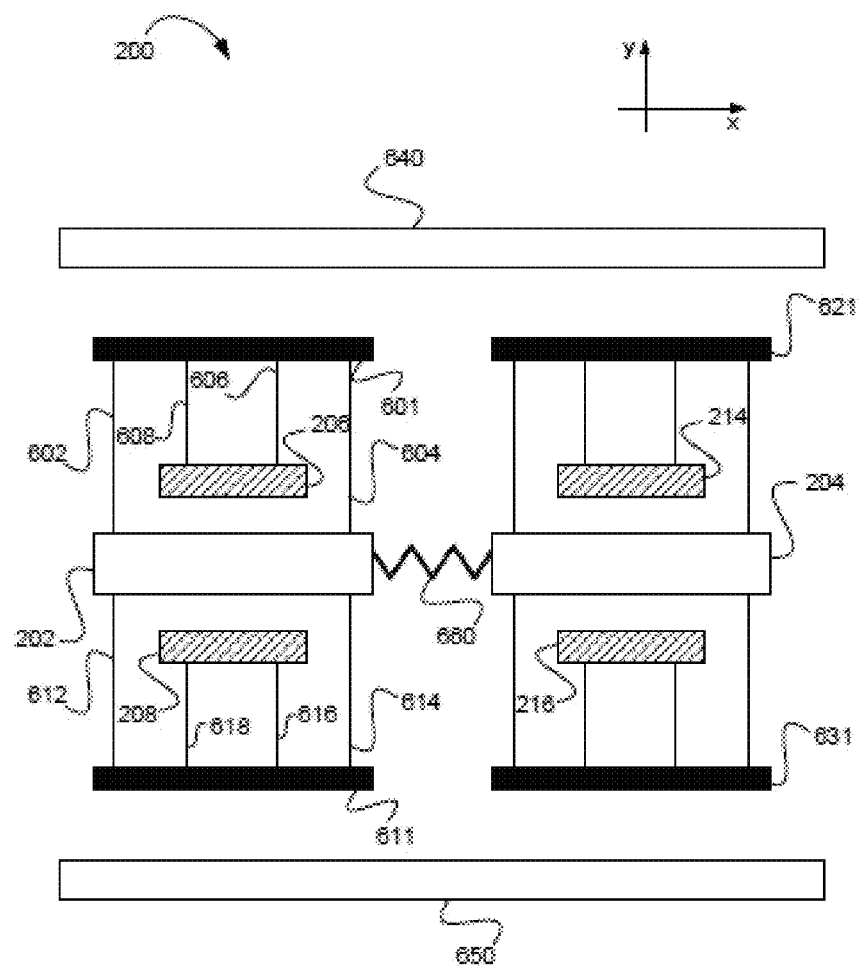
FIGS. 17 and 18 are block diagrams illustrating some embodiments of the present invention, in which the in-plane motion of the proof masses is limited to a single axis.
Figure 18:
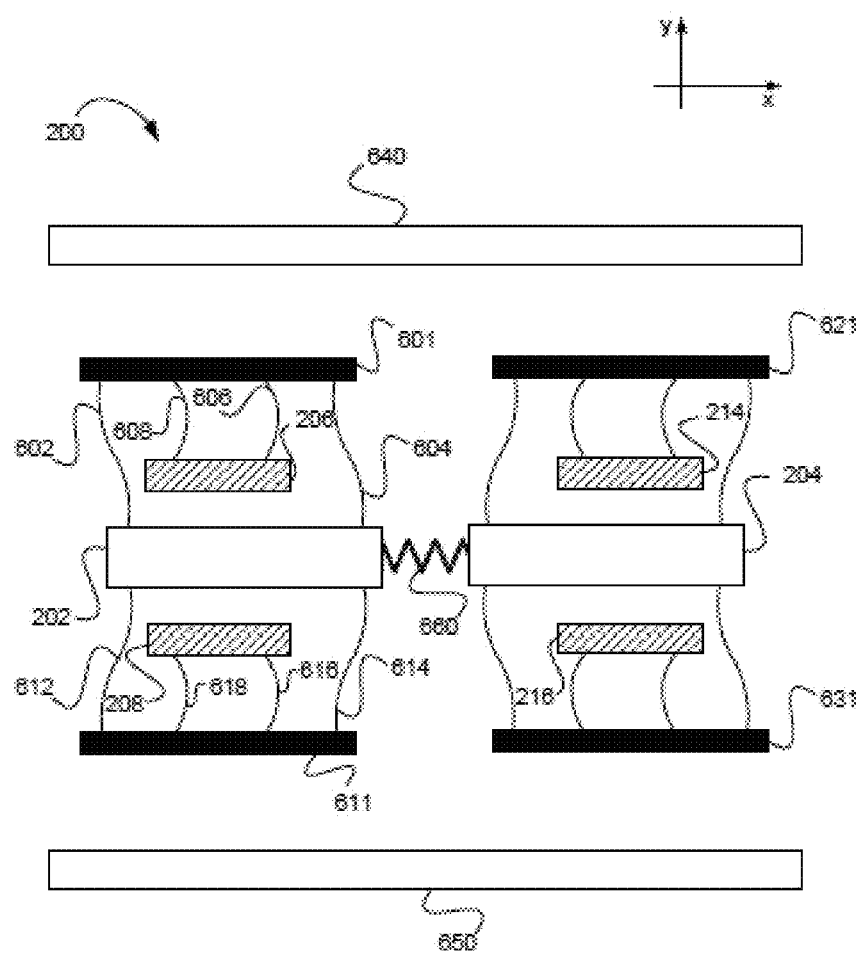

Reference is now made to FIGS. 17 and 18, which describe more specifically an example of a configuration and operation of the device of the invention in the embodiment of FIG. 3b. In this example, the in-plane motion of the proof masses is limited to a single axis. In FIG. 17, the beams are in their straight mode. In FIG. 18, the beams are in their curved mode.

In the devices in FIGS. 17-18 the drive-mode motion is in x axis. The device 200 of FIGS. 17 and 18 is configured for generating out-of-plane vibration (in the z-axis, into the page) in the sense mode of a pair of proof masses in response to rotation of the device about the y-axis (i.e. the axis parallel to the main axis of the beams).

The device 200 includes at least one pair of proof masses (202 and 204). On a first side, the proof mass 202 is joined to a first movable electrode 601 via at least two flexible suspended beams 602, 604. The first movable electrode 601 is joined to at least two flexible beams (606 and 608, in the present example), which in turn, are joined to an anchor 206. On a second side, the proof mass 202 is joined to a second movable electrode 611 via two or more suspended beams (612 and 614). The second movable electrode 611 is joined to two or more flexible beams (616 and 618, in the present example), which in turn, are joined to an anchor 208. The second proof mass 204 is joined to a movable electrode 621 and to an anchor 214 on a first side, and to a movable electrode 631 to an anchor 216 on a second side in the same manner.

On the first side, the electrodes 601 and 621 are actuated by a first actuating electrode 640. On the second side, the electrodes 611 and 631 are actuated by the second actuating electrode 650.

When the voltage of the actuating electrodes 640 and 650 is changed, the tension force within the beams 602, 604, 606, 608, 612, 614, 616, 618 is changed periodically resulting in parametric actuation. Upon actuation, the beams may straighten or curve.

In a non-limiting example, the beams are initially straight, when the device is at rest (FIG. 17). Upon actuation, the electrodes move away from the actuation electrodes (FIG. 18). Therefore, the upper electrodes 601 and 621 move away from the upper actuating electrode 640, while the lower electrodes 611 and 631 move away from the lower actuating electrode 650. As the upper electrode 601 moves away from the actuating electrode 640 and toward the anchor 206, the beams (608 and 610) between the electrode 601 and the anchor 206 assume a curved form. Similarly, as the lower electrode 611 moves away from the lower actuating electrode 650, the beams (616 and 618) between the lower electrode 611 and the anchor 208 assume a curved form.

The beams (602 and 604) joining the upper electrode 601 and the proof mass 602 apply a downward force of the proof mass 202. This downward force is countered by an upward force applied on the proof mass 202 by the beams (612 and 614) which join the lower electrode 621 to the proof mass 202. Therefore, the proof mass 202 does not move along the y axis (the main axis of the beams).

However, the beams 602 and 604 and the beams 612 and 614 are subjected to an opposite force by the proof mass 202, causing the beams to bend. The beams are configured for bending in a manner which moves the proof mass 202 along the x-axis, i.e. an in-plane axis perpendicular to the main axis of the beams. While, in FIG. 18, the motion of the proof mass 202 is toward the proof mass 204, the beams may be configured for causing the proof mass 202 to move away from the proof mass 204.

The actuation by the actuating electrodes 640 and 650 acts on the second proof mass 204 in a similar manner. The beams connected to the second proof mass 204 are configured to bend in a manner which causes the second proof mass 204 to move in a direction opposite to the direction in which the first proof mass 202 moves.

As the actuation is modulated (e.g. by applying a periodically changing voltage to the actuating electrodes 640 and 650, and/or to the electrodes 601, 611, 621, 631), the motion of the proof masses 202 and 204 is an oscillating, anti-phase motion along the x-axis. This oscillating motion is subjected to a parametric excitation, as the stiffness of the beams changes periodically. When the device 200 rotates about the y-axis, the vibration of the proof masses 202 and 204, coupled with the Coriolis force causes the masses to oscillate in the z-axis (out-of-plane, sense-mode oscillation). This oscillation can be measured and used in order to determine the angular rate.

According to some embodiments of the present invention, the drive-mode motion is both in the x-axis and in the z-axis. In such case, the width of the suspension beams is chosen in such a way that the natural frequencies of the out-of-plane (z-axis) and of the in-plane (x-axis) motion are matched or have a small split. Thus, the in-plane parametric actuation is accompanied by the actuation of the out-of-plane motion in the drive mode. As a result, each of the proof masses performs an elliptical motion in the x-z plane in the drive mode. The rotational motion about the y-axis results in the appearance of the Coriolis force (which is in phase with the velocity of the in-plane vibrations) which affects the out-of-plane motion, and therefore causes a change of the phase between the in-plane and the out-of-plane motions. The measurement of this change of phase (or the calculation thereof via measured characteristics of the in-plane and out-of-plane motions) can be used to calculate the Coriolis force, and therefore the rotation of the device 200 (which corresponds to the rotation of the object to which the device 200 is anchored/joined).

It should be noted that the masses are not coupled electrostatically in this example. Therefore, anti-phase motion may be difficult to achieve. Thus, according to a preferred embodiment, a compliant element 660 which functions as a spring is placed between the proof masses 202 and 204, in order to mechanically couple the motion of the proof masses.

While the above example was described in the framework of initially straight beams, the device 200 can be configured having initially curved beams, in order to achieve the same anti-phase, parametrically excited oscillation of the proof masses. As mentioned above, a configuration with initially straight beams may be used in order to give rise to parametric amplification.

Reference is now made to FIG. 19, which describe more specifically an example of a configuration and operation of the device of the invention in the embodiment of FIG. 3b, where the sense-mode motion and the drive-mode motion are separated, enabling easier detection of the sense mode motion.

The device 200 of FIG. 19 is similar to the device of FIGS. 17-18. However, in FIG. 19, the elements that are joined to anchors via suspended beams and actuating electrodes are frames 203 and 205. The application of voltage actuating electrodes 640 and 650, and/or to the electrodes 601, 611, 621, 631 causes the anti-phase, sense mode motion of the frames 203 and 205. The frames 203 and 205 enclose the proof masses 202 and 204, respectively. The physical link between the masses 202 and 204 and their respective frames is such that a motion of the proof masses relative to their respective frames is allowed. In a first variant, the proof mass 202 (204) may joined to the respective frame 203 (205) by one or more compliant beams, which enable a motion of the proof masses 202 (204) in the y-axis (similar to the example of FIG. 15). In a second variant, the proof mass 202 (204) may joined to the respective frame 203 (205) by one or more hinges, which enable a tilting motion of the proof masses 202 (204) in the y-z plane (similar to the example of FIG. 16).

Therefore, in the first variant, the drive-mode motion of the frames in the x-axis and the rotation of the device 200 about the z-axis generate a sense-mode motion of the proof masses in the y-axis. In the second variant, the drive-mode motion of the frames in the x-axis and the rotation of the device 200 about the y-axis generate a sense-mode tilting motion of the proof masses in the y-z plane. Optionally, the hinges enable both the tilting motion about y-z plane and the motion along the y-axis. In this manner, the device 200 can be used be used to simultaneously detect rotation about the z axis and y-axis.

As explained above, the advantage of having frames relative to which the proof masses have a degree of freedom lies in the fact that the sense mode-motion and drive-mode motion are separated. In this manner the detection of the sense-mode motion is facilitated.

Figure 20:
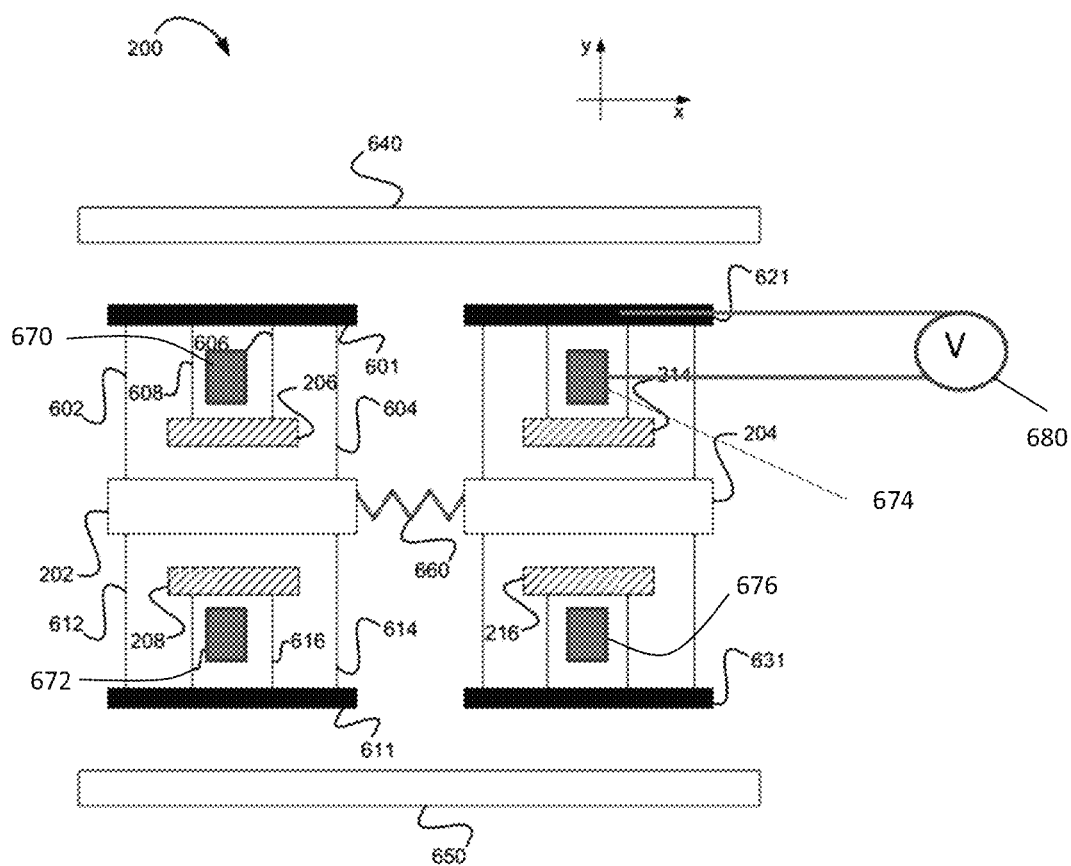
FIG. 20 schematically illustrates yet another example of the device of the present invention utilizing tuning electrodes.

Reference is made to FIG. 20 illustrating yet further example of a configuration of the device of the invention in the embodiment of FIG. 3b. The device 200 of FIG. 20 is configured generally similar to that exemplified in FIG. 17, and additionally includes tuning electrodes 670, 672, 674 and 676 associated with, respectively, electrodes 601, 611, 621, 631, and voltage supply units, generally at 680 (only one such unit being shown in FIG. 20). Each of these additional electrodes serves for tuning/calibrating the proof mass operation. More specifically, voltage supply to the respective electrodes creates an electrostatic field in the vicinity of the respective proof mass, which applies an electrostatic force to the proof mass. This enables to controllably affect the frequency of a suspension assembly formed by the flexible suspension beams.

Thus, the present invention provides a novel configuration of vibratory gyroscopes, in which the amplitude of oscillation is not limited by a distance between the proof mass and the electrode, thus enabling the gyroscope operation with a large actuating force on the proof mass, and providing an increased space for the drive-mode oscillations to take place.

The invention claimed is:

1. A rotation sensing device comprising a structure comprising:
   a proof mass arrangement comprising at least one pair of proof masses spaced-apart from one another along a first axis;
   a suspension assembly comprising flexible suspension beams having a main axis deformable between their substantially straight and curved states, the suspension assembly coupling the proof masses to an anchor assembly, while allowing a drive-mode oscillatory movement of the proof masses at least along a second axis substantially perpendicular to the main axis of the beams;
   an actuation mechanism configured and operable to apply an electrostatic force to the proof masses, causing deformation of the beams and periodic variation of the beams' stiffness, to thereby parametrically excite the drive-mode oscillatory movement of the proof masses in opposite directions along said second axis, thereby generating a sense-mode oscillatory movement of the proof masses during the rotation of the device about at least one rotation axis perpendicular to said second axis, said sense-mode movement being indicative of a rate of the rotation.

2. The device of claim 1, wherein said first axis along which the proof masses are spaced is substantially perpendicular to said second axis along which the proof masses move in drive mode.

3. The device of claim 2, wherein the proof masses of the pair face one another by their first sides, and each of the proof masses is coupled by a predetermined number of said beams to one or more anchors of the anchor assembly located at a second opposite side of the proof mass.

4. The device of claim 3, wherein the actuation mechanism comprises said proof masses being made of electrically conductive material composition, thereby allowing charging of the proof masses to create the electrostatic force therebetween.

5. The device of claim 3, comprising an electrodes arrangement comprising at least one central electrode located in a space between the proof masses of the pair.

6. The device of claim 3, comprising an inner electrodes arrangement, which comprises at least two inner electrodes, each located between a respective one of the proof masses and the one or more anchors located at the second opposite side of the respective proof mass.

7. The device of claim 2, wherein the proof masses of the pair are mechanically coupled to one another by a swing element configured for a pivotal rotation about an axis perpendicular to both the first axis and the second axis, such that the movement of one of the proof masses in one direction along said second axis causes the pivotal rotation of the swing element resulting in the movement of the other proof mass in the opposite direction along said second axis.

8. The device of claim 1, wherein said structure is substantially symmetric about the first axis.

9. The device of claim 1, wherein said first axis along which the proof masses are spaced is substantially parallel to said second axis along which the proof masses move in drive mode.

10. The device of claim 9, wherein each of the proof masses is enclosed between first and second anchors of the anchor assembly located at first and second opposite sides of said proof mass.

11. The device of claim 10, comprising an electrodes arrangement, comprising movable electrodes and fixed electrodes, wherein each of said proof masses is enclosed between first and second movable electrodes which are located at said first and second opposite sides of said proof mass, each the first and second movable electrodes being connected to the one of the first and second anchors respectively via at least one of said beams and connected to the respective proof mass via at least another one of said beams.

12. The device of claim 1, wherein said rotation axis is the main axis of the beams and wherein said sense-mode movement is along a third axis which is perpendicular to said main axis of the beams and to said second axis.

13. The device of claim 12, wherein said drive-mode movement is along the second axis and along the third axis, and said sense-mode movement is along the third axis.

14. The device of claim 13, wherein said movements along the second axis and along the third axis in the drive mode have a predetermined phase difference, and said sense mode movement along the third axis affects an overall movement of the proof masses along the third axis, causing a change in the predetermined phase difference, said change in the predetermined difference being indicative of the rate of rotation.

15. The device of claim 1, wherein:
   each of the proof masses is coupled to the suspension assembly via a respective frame;
   the actuation mechanism is configured and operable to cause the drive-mode oscillatory movement of the frames along the second axis; and
   each proof mass is joined to the respective frame via a joining element which enables movement of the proof mass relative to the respective frame.

16. The device of claim 15, wherein the movement of the proof mass relative to the respective frame comprises a tilting motion along a plane perpendicular to the second axis.

17. The device of claim 16, wherein said rotation axis is the main axis of the beams, and the sense-mode movement of the proof masses comprises the tilting motion along a plane perpendicular to the second axis.

18. The device of claim 15, wherein the movement of the proof mass relative to the respective frame comprises a translation along the main axis of the beams.

19. The device of claim 18, wherein said rotation comprises rotation about an axis perpendicular to the main axis of the beams and to the second axis, and the sense-mode movement of the proof masses comprises the translation along the main axis of the beams.

20. The device of claim 1, comprising a measuring unit for extracting at least one parameter of said oscillatory sense-mode movement, thereby enabling calculation of said rate of rotation.

21. A rotation sensing device comprising:
   at least one pair of proof masses spaced-apart from one another along a first axis;
   a suspension assembly comprising flexible suspension beams having a main axis deformable between their substantially straight and curved states, the suspension assembly coupling the proof masses of said at least one pair of proof masses to an anchor assembly, while allowing a drive-mode oscillatory movement of the proof masses at least along a second axis substantially perpendicular to the main axis of the beams;
   an actuation mechanism adapted to apply an electrostatic force to the proof masses causing deformation of the beams and periodic variation of the beams' stiffness, to thereby parametrically excite the drive-mode oscillatory movement of the proof masses in opposite directions along said second axis, such that a sense-mode oscillatory movement of the proof masses is generated during the rotation of the device about at least one rotation axis perpendicular to said second axis, said sense-mode movement being indicative of a rate of the rotation.

22. A rotation sensing device comprising a structure comprising:
- a proof mass arrangement comprising at least one pair of proof masses spaced-apart from one another along a first axis, each of the proof masses being enclosed between first and second anchors of an anchor assembly located at first and second opposite sides of said proof mass;
- a suspension assembly comprising flexible suspension beams having a main axis deformable between their substantially straight and curved states, the suspension assembly coupling the proof masses to an the anchor assembly, while allowing a drive-mode oscillatory movement of the proof masses at least along a second axis substantially perpendicular to the main axis of the beams and substantially parallel to said first axis along which the proof masses are spaced;
- an actuation mechanism configured and operable to cause the drive-mode oscillatory movement of the proof masses in opposite directions along said second axis, thereby generating a sense-mode oscillatory movement of the proof masses during the rotation of the device about at least one rotation axis perpendicular to said second axis, said sense-mode movement being indicative of a rate of the rotation; and
- an electrodes arrangement, comprising movable electrodes and fixed electrodes, wherein each of said proof masses is enclosed between first and second movable electrodes which are located at said first and second opposite sides of said proof mass, each the first and second movable electrodes being connected to the one of the first and second anchors respectively via at least one of said beams and connected to the respective proof mass via at least another one of said beams.

* * * * *